(12) United States Patent
Kneafsey et al.

(10) Patent No.: US 7,267,886 B2
(45) Date of Patent: *Sep. 11, 2007

(54) POLYMERISATION INITIATORS, POLYMERISABLE COMPOSITIONS, AND USES THEREOF FOR BONDING LOW SURFACE ENERGY SUBSTRATES

(75) Inventors: Brendan J. Kneafsey, Dublin (IE); Gerry Coughlan, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 28 days.

This patent is subject to a terminal disclaimer.

(21) Appl. No.: 11/003,959

(22) Filed: Dec. 3, 2004

(65) Prior Publication Data

US 2005/0154160 A1   Jul. 14, 2005

(51) Int. Cl.
*B32B 27/08* (2006.01)

(52) U.S. Cl. ............... 428/520; 428/522; 524/853; 526/213; 526/217; 526/317; 526/319; 156/331.1

(58) Field of Classification Search ......... 428/520, 428/522; 524/853; 526/213, 217, 317, 319; 156/331.1
See application file for complete search history.

(56) References Cited

U.S. PATENT DOCUMENTS 5,866,631 A * 2/1999 Nakagawa et al. ......... 523/118
5,935,711 A * 8/1999 Pocius et al. ............... 428/421
6,939,932 B2 * 9/2005 Kneafsey et al. ........... 526/217

* cited by examiner

Primary Examiner—Leszek B. Kiliman
(74) Attorney, Agent, or Firm—Steven C. Bauman

(57) ABSTRACT

Quaternary boron salts are used as initiators of polymerisation in adhesive compositions for bonding low surface energy substrates such as polyolefins. The quaternary boron salts are of the formula I

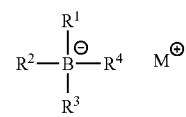

wherein $R^1$ is $C_1$–$C_{10}$ alkyl,
$R^2$, $R^3$ and $R^4$, which may be the same or different, are, $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^4$ may optionally be part of a carbocyclic ring, and
$M^+$ is a metal ion or a quaternary ammonium ion.

Particular examples of initiator compounds include sodium tetraethyl borate and lithium tetraethyl borate, lithium phenyl triethyl borate and tetraethylammonium phenyl triethyl borate.

20 Claims, No Drawings

US 7,267,886 B2

POLYMERISATION INITIATORS, POLYMERISABLE COMPOSITIONS, AND USES THEREOF FOR BONDING LOW SURFACE ENERGY SUBSTRATES

CROSS REFERENCE TO RELATED APPLICATION

This application is a division of U.S. Pat. No. 10/399,230 filed Sep. 15, 2003 (now U.S. Pat. No. 7,189,463) and claims the benefit of earlier filed International Patent Application No. PCT/IE01/00134 filed 23 Oct. 2001, which claims the benefit of earlier filed European Patent Application No. 00650166.2 filed Oct. 23, 2000.

FIELD OF THE INVENTION

This invention relates to polymerisation initiators, polymerisable compositions particularly acrylic adhesive compositions and uses thereof for bonding low surface energy substrates such as polyolefins to each other or to other substrates such as metals.

BRIEF DESCRIPTION OF RELATED TECHNOLOGY

It is well known that the bonding of polyolefin substrates and other low surface energy substrates causes particular difficulties. Attempts have been made to overcome this problem by extensive and expensive substrate surface preparation, for example by oxidation, plasma treatment, corona treatment or flame treatment, or by priming the surface with a high surface energy primer. However it is desired to develop adhesive compositions which will bond low surface energy substrates without such surface preparation.

The chemistry of organic boron compounds has been studied in detail (see "Comprehensive Organic Chemistry" by Baron D. and Ollis W. D., Volume 3, Edited by Jones D. N., Pergamon Press, 1979,Part 14). The use of organoboranes such as the trialkylboranes including triethylborane and tributylborane for initiating and catalyzing the polymerisation of vinyl monomers is well known. However such organoborane compounds are known to be flammable in air so that the compounds and compositions containing them require special handling and the compositions have poor shelf stability (see for example U.S. Pat. No. 3,236,823 Jennes et al., and the Background section of U.S. Pat. No. 5,935,711 Pocius et al., at column 2).

Certain boron alkyl compounds and their use as initiators of polymerisation are described in a series of patents of Wolfgang Ritter assigned to Henkel KgaA, including U.S. Pat. Nos. 4,515,724, 4,638,092, 4,638,498, 4,676,858 and 4,921,921 (hereinafter referred to as "the Ritter patents"). However the adhesive systems developed from these patents require the manufacture of trialkyl boranes from long chain fatty acids.

A series of patents of Skoultchi or Skoultchi et al. disclose a two-part initiator system for acrylic adhesive compositions in which the first part includes a stable organoborane amine complex and the second part includes a destabilizer or activator such as an organic acid or an aldehyde (U.S. Pat. Nos. 5,106,928; 5,143,884; 5,286,821; 5,310,835 and 5,367,746).

Japanese patent publication No. S48-18928 describes a method for adhering polyolefin or vinyl polymers using an adhesive obtained by adding trialkylboron to a vinyl monomer or vinyl monomer and vinyl polymer. Examples of trialkylboron include triisopropylboron, tri-n-butylboron, tripropylboron and tri-tert.-butylboron.

U.S. Pat. No., 3,275,611, Mottus et al. describes a process for polymerising unsaturated monomers with a catalyst comprising an organoboron compound, a peroxygen compound with an amine complexing agent for the boron compound. Use of the polymerisation products as adhesives is not discussed.

U.S. Pat. No. 5,539,070 of Zharov et al. assigned to Minnesota Mining and Manufacturing Company and a series of patents of Alphonsus V. Pocius or Pocius et al. also assigned to Minnesota Mining and Manufacturing Company, including in particular U.S. Pat. Nos. 5,616,796, 5,621,143, 5,681,910, 5,684,102, 5,686,544, 5,718,977, 5,795,657 and 5,935,711 describe organoborane amine complexes which can be used in systems that initiate the polymerisation of acrylic monomers in compositions useful for bonding low surface energy plastics substrates such as polyethylene, polypropylene and polytetrafluoroethylene. PCT Publication No. WO 99/64528 also of Minnesota Mining and Manufacturing Company describes low odour polymerisable compositions comprising monomer blends and organoborane amine complex initiators. However these systems require the preparation of trialkyl borane amine complexes to achieve the desired performance and shelf stability. The manufacture of such complexes is an undesirably complicated process. Furthermore the presence of the amines results in cured adhesives that have a tendency to become yellow in colour on ageing.

In the unrelated field of photopolymerisation for colour imaging materials, it is common to use cationic dye—borate anion complexes as photopolymerisation initiators (see for example U.S. Pat. Nos. 4,772,530, 4,772,541 and 5,151,520 of Gottschalk et al., assigned to The Mead Corporation). As particularly described in U.S. Pat. No. 4,772,530, the complexes can be represented by the general formula:

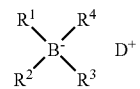

where $D^+$ is a cationic dye; and $R^1$, $R^2$, $R^3$ and $R^4$ are independently selected from the group consisting of alkyl, aryl, alkaryl, allyl, aralkyl, alkenyl, alkynyl, alicyclic and saturated or unsaturated heterocyclic groups. The borate anion is designed such that the borate radical generated from exposure to light and after electronic transfer to the dye readily dissociates with the formation of a radical as follows:

It is stated that particularly preferred anions are triphenylbutylborate and trianisylbutylborate anions because they readily dissociate to triphenylborane or trianisylborane and a butyl radical. On the other hand it is stated that tetrabutylborate anion does not work well presumably because the tetrabutylborate radical is not stable and it readily accepts an electron back from the dye in a back electron transfer and does not dissociate efficiently. Likewise, tetraphenylborate anion is very poor because the phenyl radical is not easily formed.

The photopolymerisable compositions of the above-mentioned patents assigned to The Mead Corporation are used in imaging materials, not adhesive compositions.

U.S. Pat. No. 4,950,581 Koike et al, assigned to Fuji Photo Film Co. Ltd, describes a photopolymerisation initiator for use in the field of imaging, comprising a combination of (a) an organic compound represented by the formula:

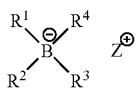

wherein $R^1$, $R^2$, $R^3$, and $R^4$, which may be the same or different, each represents a substituted or unsubstituted alkyl group, a substituted or unsubstituted aryl group, a substituted or unsubstituted alkenyl group, a substituted or unsubstituted alkynyl group, or a substituted or unsubstituted heterocyclic group, and at least two of said $R^1$, $R^2$, $R^3$, and $R^4$ may combine to form a cyclic structure, with the proviso that at least $R^1$, $R^2$, $R^3$, and $R^4$ is an alkyl group, and wherein $Z^+$ represents an alkali metal cation or a quaternary ammonium cation, and (b) an organic dye having no counter anion.

Examples of such organic boron compounds include tetraethylammonium triphenylbutyl borate, tetramethylammonium triphenylbutyl borate, tetra-n-butylammonium tri-4-methoxyphenyl butyl borate, tetra-n-butylammonium triphenyl butyl borate, tetra-n-butylammonium tetra-n-butyl borate, sodium triphenyl-n-butylborate, tetramethylammonium triphenylbenzylborate.

Suitable organic dyes having no pair anion for the photopolymerisation initiator include merocyanine series dyes, coumarin series dyes, and xanthene or thioxanthene dyes. The Koike et al. patent is not concerned with adhesive compositions.

U.S. Pat. No. 6,110,987 Kamata et al. assigned to Showa Denko K.K. describes a photocurable composition comprising an ultraviolet radical polymerisation initiator, a cationic dye with absorbtions in the visible light region, a quaternary boron salt and optionally a polymerisation accelerator. The quaternary boron salt sensitizer is represented by the general formula

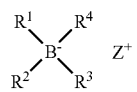

wherein $R_1$, $R_2$, $R_3$, and $R_4$ each independently represent an alkyl group which may have a substituent, an aryl group which may have a substituent, an allyl group which may have a substituent, an aralkyl group which may have a substituent, an alkenyl group which may have a substituent, an alkynyl group which may have a substituent, a silyl group which may have a substituent, a heterocyclic group or a halogen atom, and $Z^+$ represents a quaternary ammonium cation, quaternary pyridinium cation, quaternary quinolinium cation, phosphonium cation, sulfonium cation, oxosulfonium cation, iodonium cation or metal cation, and mixing these with a compound which has a radical polymerizable unsaturated group.

Examples of the cation portion mentioned include tetramethylammonium, tetraethylammonium, tetra-n-butylammonium, tetraoctylammonium, lithium cation and sodium cation. In the working examples, the cation portions are all tetra-n-butylammonium, and the anion portions are n-butyltriphenyl borate, n-butyltri(4-t-butylphenyl)borate, n-butyltri(2-tolyl)borate, n-butyltri(4-tolyl)borate, n-butyltri(4-fluoro-2-methylphenyl)borate.

In the above described photopolymerizable compositions, cationic dyes or other organic dyes are used to absorb light and to facilitate transfer of energy or electrons. The distinction between triorganylboranes and organoborate salts is well illustrated in "Comprehensive Organic Chemistry" by Barton D. & Ollis W. D. (Ed. D Neville Jones) cited above, Volume 3, in which separate chapters, Chapters 14.3 and 14.4, are devoted to them. The photopolymerisable compositions of the above-mentioned patents are not intended for use as adhesives, sealants and the like. Photopolymerisation systems operate by absorption of light energy, and the characteristic feature of such systems is that they have light-absorbing ability. It is not predictable whether photopolymerisation initiators will be suitable for other cure systems or for bonding substrates having particular surface energy conditions. In particular, the above-mentioned patents concerning photopolymerisation initiators do not provide any disclosure or teaching relating to the bonding of low surface energy substrates.

U.S. Pat. No. 6,171,700 Sugita et al. assigned to Showa Denko K.K. and Showa Highpolymer Ltd. describes a curable composite material comprising (A) a fibre reinforcing material eg carbon cloth, aramid fibre cloth, or continuous glass mat, and/or fibre filler eg. glass roving, (B) a polymerizable unsaturated compound, (C) a polymerisation initiator comprising (a) an organic boron compound similar to that described in the above-mentioned U.S. Pat. No. 6,110,987, (b) an acidic compound, and (c) a hexaarylbiimidazole.

The acidic compound may be a latent acid-generating agent. In the working examples a light/heat induced latent acid generator (sulfonium compound) is used. The process for curing the composite material composition in the working examples comprises irradiating it. This patent is concerned with particular problems of photocuring compositions containing fibre reinforcing material and/or filler, particularly when the composite material composition is relatively thick or is a construction that inhibits light permeation. It does not contain any teaching relevant to the bonding of low surface energy substrates.

There is a need for commercially acceptable compositions for bonding low surface energy substrates such as polyolefins and for end users to have a variety of such compositions which achieve that result through different technical strategies. Despite the work of many researchers in this field, there is a need for polymerisation initiators which reduce the problems described above and which provide alternative systems to those available hitherto. It is desirable to provide initiators which are commercially available compounds and/or which are relatively easy to handle compared to compounds of the prior art.

SUMMARY OF THE INVENTION

This invention relates to the use of a compound of the formula I:

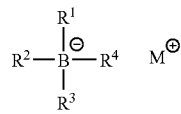

wherein $R^1$ is $C_1$–$C_{10}$ alkyl, $R^2$, $R^3$ and $R^4$, which may be the same or different, are $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^4$ may optionally be part of a carbocyclic ring, and $M^+$ is a metal ion, or a quaternary ammonium cation, as an initiator of polymerisation in an adhesive composition for bonding a low surface energy substrate.

The applicants are not aware of any disclosure or teaching of the use of ionic compounds of this kind as polymerisation initiators in adhesive compositions for bonding low surface energy substrates.

The initiator compounds of formula I are quaternary boron salts. According to one aspect of the invention, $M^+$ is a metal ion. If $M^+$ is a quaternary ammonium cation, it may suitably be of the formula II:

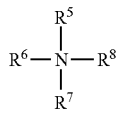

wherein $R^5$–$R^8$, which may be the same or different, are $C_1$–$C_{10}$ alky, $C_1$–$C_{10}$ alkenyl, $C_3$–$C_{10}$ cycloalkyl, aryl, $C_1$–$C_{10}$ alkylaryl, aryl$C_1$–$C_{10}$alkyl or aryl$C_1$–$C_{10}$ cycloalkyl, provided that any two of $R^5$–$R^8$ may be part of an optionally unsaturated carbocyclic ring. Aryl is suitably optionally substituted phenyl, wherein the phenyl ring may be substituted, for example with $C_1$–$C_{10}$ alkyl, particularly $C_1$–$C_6$ alkyl, or halo, particularly Cl, Br or F. Examples of a quaternary ammonium cation include a tetra $C_1$–$C_{10}$ alkylammonium cation, particularly a tetra $C_1$–$C_5$ alkylammonium cation, for example tetramethylammonium, tetraethylammonium or tetra-n-butylammonium, or a tri$C_1$–$C_{10}$ alkylarylammonium cation wherein aryl is phenyl, substituted phenyl (with phenyl being substituted as above), or phenyl-substituted $C_1$–$C_{10}$ alkyl or $C_3$–$C_{10}$ cycloalkyl.

An alkyl group may suitably have 1-6 carbon atoms, for example 1-4 carbon atoms. An alkyl group may be straight-chain or branched. A carbocyclic ring may be bridged by the boron atom in formula I.

The initiator compounds used in the present invention are commercially available or are readily prepared by available methods. One exemplary compound, sodium tetraethyl borate is available in solid form, thus enabling the formulation of solvent-free adhesives, which is a significant advantage for environmental and labelling reasons, as well as reducing potential flammability. The initiator compounds of the invention do not require the use of amines which have been used in the past to form covalent complexes with organoboranes. Once the organoborane of such complexes has reacted in a polymerisable composition, the amine can cause yellowing of a cured composition after ageing. A reduction or elimination of yellowing is a particular advantage for adhesives which are to be used in locations where appearance is important, e.g. in automobile manufacture. Amines may also give rise to odour problems.

The invention provides a polymerisable adhesive composition for bonding a low surface energy substrate to a similar or different substrate, which includes:
  a) at least one free-radically polymerisable monomer component, and
  b) an effective amount of an initiator system for initiating polymerisation of the free-radically polymerisable monomer, said initiator system comprising a compound of the formula I as defined above, with the proviso that the composition does not contain a light-absorbing dye.

The polymerisable composition may suitably be a two-part composition in which at least one free-radically polymerisable monomer component is provided in one part and the initiator compound of formula I is provided in the other part. Alternatively the composition could be a one-part composition with suitable stabilisation and activation systems such as a moisture-latent acid or oxygen-latent acid. In a further alternative, the initiator compound of formula I could be provided as a primer which is applied to a substrate separate from the polymerisable monomer component.

The polymerisable monomer or monomers may suitably be one or more (meth)acrylic monomers.

In one aspect the invention provides a two-part polymerisable adhesive composition for bonding a low surface energy substrate to a similar or different substrate, which includes:
  part A) an effective amount of a polymerisation initiator comprising a compound of the formula I as defined above, and a carrier which is inert to the compound of formula I;
  part B) at least one (meth)acrylate monomer, optionally with a toughener, acidic monomer, filler or thickener.

Part B may suitably be a (meth)acrylic component. The terms (meth)acrylic and (meth)acrylate are used synonymously herein with regard to the monomer and monomer-containing component. The terms (meth)acrylic and (meth)acrylate include acrylic, methacrylic, acrylate and methacrylate.

No cationic dyes, visible light or ultraviolet radical polymerisation initiators or hexaaryldiimidazole are required in the adhesive compositions of the invention The adhesive compositions disclosed herein are useful for bonding low surface energy substrates e.g. those having a surface energy of less than 45 mJ/m², more particularly polyolefins including polyethylene and polypropylene, acrylonitrile-butadiene-styrene and polytetrafluroethylene, or relatively low surface energy substrates such as polycarbonate, to similar substrates, to each other, or to different substrates including metals, other plastics and glass.

Furthermore the invention provides a method for bonding a low surface energy substrate to a similar or different substrate, wherein the method comprises applying an adhesive composition as defined above to at least one of the substrates, bringing the substrates together and allowing the composition to cure. The curing step does not involve photopolymerisation. In one aspect, the invention provides a method as defined above for bonding polyolefin substrates.

In particular the invention provides a method for bonding a low surface energy substrate to a similar or different substrate, wherein the method comprises mixing parts A and B of a two part adhesive composition immediately prior to use in order to initiate polymerisation, applying the mixed adhesive composition to at least one of the substrates, bringing the substrates together and allowing the composition to cure by completion of the polymerisation initiated on mixing of the two parts A and B

DETAILED DESCRIPTION OF THE INVENTION

According to one aspect of the invention M is an alkali metal ion such as lithium, sodium, potassium, or caesium, particularly lithium, sodium or potassium, although metallic elements in the second row of the Periodic Table such as barium, magnesium or calcium may be useable, as may transition metals such as copper, iron or cobalt.

$R^1$–$R^4$ may suitably be the same or different alkyl groups and each may suitably be a $C_1$–$C_6$ alkyl group, particularly a $C_2$–$C_4$ alkyl group. Large or bulky alkyl groups are considered to be less likely to provide desirably active initiators, as will be understood by those skilled in free-radical chemistry.

An example of a compound in which $R^1$–$R^4$ are the same alkyl group is Sodium tetraethylborohydride, alternatively called sodium tetraethylborate, which is commercially available from various suppliers such as Sigma-Aldrich Ireland Limited. Other suitable compounds include lithium tetraethyl borohydride, alternatively called lithium tetraethylborate, lithium phenyl triethyl borate and tetramethylammonium phenyl triethyl borate.

Desirably at least two, particularly all three, of $R^2$, $R^3$ and $R^4$ are $C_1$–$C_{10}$ alky. Suitably one or more of $R^2$, $R^3$ and $R^4$ may be phenyl. Desirably not more than one of $R^2$, $R^3$ and $R^4$ contains a phenyl group. It will be understood by those skilled in the art that a phenyl group (if present) may be substituted in the ring by one or more substituents which do not affect the activity of the compound of formula I as a polymerisation initiator. Such ring-substituents include $C_1$–$C_{10}$ alkyl, for example $C_1$–$C_6$ alkyl, particularly methyl.

An initiator compound which is not a solid may suitably be used in a solvent such as Tetrahydrofuran, diglyme, dibutyl ether, toluene or a hydrocarbon solvent, suitably at a 1 molar concentration preferably not greated thanabout 1.5 molar, although the person skilled in the artwill select a suitable concentration depending upon the solvent used.

The quantity of initiator compound of formula I may suitably be such as to provide 0.01% to 5% by weight, particularly 0.01% to 2% by weight, such as 0.01 to 0.6% by weight, of boron in the total composition. For ease in handling of an initiator compound which is not used as a solid, the initiator compound is suitably used in a solution in a concentration up to about 1.5M, such as about 1M.

The free-radically polymerisable monomer may be selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes. Among suitable acrylates and methacrylates are those used in polymerisable systems such as disclosed in U.S. Pat. No. 4,295,909, U.S. Pat. No. 4,018,851, U.S. Pat. No. 4,963,220 to Baccei et. al., and U.S. Pat. No. 4,215,209 to Ray-Chaudhuri et. al. or polyfunctional methacrylates silicone diacrylates and polyfunctional acrylated urethanes of the type known to be useful in formulating adhesives e.g. as disclosed in U.S. Pat. No. 4,092,376 to Douek et. al.) or a thiol-ene (e.g. as disclosed in U.S. Pat. Nos. 3,661,744, 3,898,349, 4,008,341 or 4,808,638). The contents of the above-mentioned patents are incorporated herein by reference.

Suitable monomers include monofunctional acrylate and methacrylate esters and substituted derivatives thereof such as hydroxy, amide, cyano, chloro, and silane derivatives. Such monomers include tetrahydrofurfuryl (meth)acrylate, methyl (meth)acrylate, ethyl (meth)acrylate, isobornyl methacrylate, hydroxyethyl methacrylate, hydroxypropyl (meth)acrylate, butyl acrylate, n-octyl acrylate, 2-ethylhexyl (meth)acrylate, decylmethacrylate, dodecyl methacrylate, cyclohexyl methacrylate, tert.-butyl methacrylate, acrylamide, gamma-methacryloxypropyl trimethoxysilane, 2-cyanoethyl acrylate, 3-cyanopropyl acrylate, tetrahydrofurfuryl chloroacrylate, and glycidyl (meth)acrylate.

Blends of two or more monomers, particularly two or more (meth)acrylate monomers, may desirably be used, the choice of monomers in the blend being determined by the end use application of the compositions, as known to those skilled in the art.

The addition of an acid (which term includes a latent acid) in the monomer component (Part B) is desirable. For certain substrates and/or certain polymerisation speeds, the presence of an acid may be required. In other cases, acidic residues, for example in the monomers, may be sufficient. Alternatively, or in addition, the initiator compound of formula I may react with another compound in the composition (particularly in Part B of a two-part composition), thus freeing the alkylborane to initiate polymerisation of the polymerisable composition. In the case of a 2-part composition, the reaction takes place after mixing of the two parts, one containing the initiator compound of formula I and the other containing the compound reactive therewith.

The acid when added may suitably be a weak acid. Lewis acids may be used (see U.S. Pat. No. 5,539,070 to Zharov et al., the contents of which are incorporated herein by reference). The pKa of the weak acid normally is no lower than about 0.5 with the desirable limit being about 0.9. The upper limit normally is about 13, or less, such as 11.5. However, carboxylic acids which have a pKa of up to about 8, such as 6 or 7, are particularly suitable.

The carboxylic acids may contain one or more carboxyl groups, suitably 1 to 4, and more preferably 1 to 2, carboxyl groups. Suitable aliphatic carboxylic acids ordinarily include $C_{1-18}$ chains, such as $C_{1-10}$ monocarboxylic acids.

Suitable acids may be monobasic or polybasic. Typical but not limiting examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid and saccharin. It is particularly suitable to use an acidic monomer which can itself be polymerised, so that it is bound into the cured polymer composition, for example a part-ester of a polyfunctional acid wherein the ester group contains a free-radically polymerisable component, particularly a (meth)acrylic halfester of a difunctional acid such as maleic, fumaric or succinnic acid e.g. 2-(meth)acryloyloxyethyl maleate, 2-(meth)acryloxyethyl fumarate or 2-(meth)acryloxyethyl succinate. The effective amount of the acid (or the acid residue of an acidic monomer or residue resulting from preparation of a monomer) is suitably within the range from about 0.1 to about 20%, particularly from about 0.1 to about 10%, such as from about 0.5 to about 5%, by weight based on the weight of the polymerisable composition. The amount of an acidic monomer is suitably within the range from about 0.1% to about 25%, such as about 0.5% to about 15%, by weight based on the weight of the polymerisable composition.

The acid may be present as a latent acid, particularly a masked carboxylic acid compound hydrolyzable on contact with moisture, such as an acid anhydride, as described in EP-A-0 356 875 and U.S. Pat. No. 5,268,436, the contents of which are incorporated herein by reference. A latent acid may be used in Part B of a two-part composition, in which the acid is released on mixing the two parts, or in a one-part composition.

The presence of air or oxygen is desirable at the time of initiation of polymerisation e.g. when the two parts of a two-part composition are mixed.

The initiator compound of formula I is desirably used with a carrier which is non-reactive with the initiator compound. Most suitably, the carrier should be liquid, should be capable of supporting and carrying the initiator compound, should be moisture-free, non-reactive with a base and not susceptible to free-radical polymerisation. The carrier may suitably be a solvent for the initiator compound.

It is important that the initiator compound and carrier should not react together or start to cross-link, causing a change in viscosity, before polymerisation of the total polymerisable composition is initiated. Suitable carriers include aziridine-functional materials which are described as diluents in PCT Publication No. WO 99/64528, which in turn refers to PCT Publication No., WO 98/17694, equivalent to U.S. Pat. No. 5,935,711, the contents of all of which are incorporated herein by reference. When used, the initiator compound of formula I is carried by (e.g., dissolved in or diluted by) an aziridine-functional material or a blend of two or more different aziridine-functional materials in the initiator component. Generally, the aziridine-functional material should not be reactive toward the initiator compound and functions as an extender for the initiator. Also advantageously, the aziridine-functional material may generally increase the spontaneous combustion temperature of the initiator component.

An "aziridine-functional material" refers to an organic compound having at least one aziridine ring or group,

the carbon atom(s) of which may optionally be substituted by $C_1$–$C_{10}$ alkyl groups, particularly $C_1$–$C_3$ alkyl groups.

Suitable aziridine-functional materials are described in WO 98/17694 (U.S. Pat. No. 5,935,711). Polydifunctional aziridines such as trimethylolpropane tris(3-(2-methylaziridino)propionate are particularly suitable. The aziridine-functional material may also act as a cross-linking agent in the polymerisable composition, e.g. by reaction with an acid monomer or polymeric acid which may suitably be present in the composition as described above.

The aziridine-functional material should be generally soluble in monomers included in the polymerisable composition, such that the parts of the two-part composition can be readily mixed. By "soluble" is meant that no evidence of gross phase separation at room temperature (i.e., about 22° C. to about 25° C.) is visible to the unaided eye. Similarly, the initiator compound of formula I should also desirably be soluble in the aziridine-functional material, although slightly warming a mixture of the initiator compound and the aziridine-functional material may be helpful in forming a solution of the two at room temperature (i.e., about 22° C. to about 25° C.). Accordingly, preferably, if used, the aziridine-functional material is a liquid at or near room temperature (i.e., within about 10° C. of room temperature) or forms a liquid solution with the initiator compound at or near room temperature.

Other suitable carriers include liquid polyethers, liquid polyethers capped with non-reactive groups being groups which are not susceptible to free-radical polymerisation such as epoxies, liquid polyesters, polyisoprene or polybutadiene. A thickened solvent could also be used as a carrier. Polytetrahydrofuran could be used as both solvent and carrier. The quantity of carrier may suitably be in the range from about 5% to about 50% by weight, for example 5% to 25% by weight, particularly 5% to 10% by weight, of the total composition. It is an advantage of the present invention that a wider range of carriers can be used than with an amine-containing initiator system, e.g. an epoxy which could react with the amine.

The initiator compound of formula I and the carrier, optionally with a thickener or filler, are usually contained in Part A—the initiator component—of a two-part composition. If desired, Part A may also contain a complexing agent or sequestering agent, e.g. a calixarene or a polyether or polythioether, e.g. a crown ether or thiocrown ether respectively, with affinity for the metal in the initiator compound.

The monomer containing component—Part B of a two-part composition—may suitably include a toughener to improve the impact resistance and peel resistance of the bond while maintaining adhesive strength. Suitable tougheners include elastomeric materials such as polybutadiene rubbers, polyisoprene (e.g. available under the trade name Kratan), acrylonitrile-butadiene-styrene (e.g. available under the trade name Hycaror or as core-shell polymers under the trade name Blendex), or polystyrenes. For bonding polyolefins it is desirable to use a core-shell polymer. The use of core-shell polymers in (meth)acrylate-based compositions is described, for example, in U.S. Pat. Nos. 4,536,546 and 4,942,201 Briggs et al. assigned to Illinois Tool Works. Core shell polymers are suitably graft copolymer resins (e.g. acrylonitrile-butadiene-styrene graft copolymers or others described in the above-mentioned patents of Briggs et al.) in the form of particles that comprise rubber or rubber-like cores or networks that are surrounded by relatively hard shells. In addition to improving the impact resistance of the bond, core-shell polymers can also impart enhanced spreading and flow properties to the composition (see WO 99/64528). These enhanced properties include a reduced tendency for the composition to leave an undesirable "string" upon dispensing from a syringe-type applicator, or sap or slump after having been applied to a vertical surface. The quantity of toughener may suitably be in the range from about 1% to about 40% by weight, particularly about 5% to about 25% by weight, of the total composition.

The composition may optionally further comprise oxidising agents, reducing agents, thickeners, fillers, non-reactive colourants and pigments, metal salts (particularly transition metal salts) and free radical polymerisation stabilisers. The optional additives are used in an amount that does not significantly adversely affect the polymerisation process or the desired properties of polymerisation products made thereby. Ingredients for a photopolymerisation system are not required and may be excluded.

Suitable reducing agents may be, but are not limited to, acetylphenylhydrazine, tetramethylthiourea or thiocaprolactam. Suitable oxidising agents may be, but are not limited to, peroxides and hydroperoxides.

Polymeric thickeners may be present in the compositions in a minor amount, up to about 50%, and may be thickeners such as a polymer or prepolymer of low or high molecular weight. Suitable polymeric thickeners are a commercially available methacrylate polymer sold by E. I. du Pont de Nemours and Company, under the trademark Elvacite, as well as styrene-methyl methacrylate co-polymers and polybisphenol A maleate or propoxylated bisphenol-A-fumarate polyester (sold under the trademark Atlac). It is also possible to add inert filling materials such as finely divided silica, fumed silica (treated or untreated), montmorilonite, clay, bentonite and the like. The use of micronized silica would result in a paste-like thixotropic composition.

It is an advantage of the present invention that a broader range of thickeners can be used than with an initiator system containing amine. Additionally, it is conventional to include in adhesive formulations certain "inert" fillers such as wood flour, glass fibres and hollow glass spheres, cotton linters, mica, alumina, silica and the like to modify viscosity, improve impact resistance and for other purposes such as spacing to provide a minimum bond thickness in the case of hollow glass spheres, e.g. at least 100 micrometres. Such fillers could be incorporated in the formulations of the present invention. The quantity of filler is suitably from about 0.5% to about 20%, for example about 1.0% to about5.0%, by weight of the composition. Small percentages of silane monomers could also be added to increase moisture resistance, as well as to enhance bonding of an adhesive to glass and similar surfaces. Other substances such as dyes, fire retarders, stabilizers such as quinones and hydroquinones, thixotropes, plasticizers, antioxidants, and the like may also be included, although such additives may often be furnished in the principal ingredients, making their separate introduction unnecessary.

It is a particular advantage of the invention that polyolefin materials can be used as fillers in the composition. Polyolefin powders such as polyethylene powder or polypropylene powder are relatively inexpensive and in a composition which readily bonds to a polyolefin the filler becomes securely adhered into the cured composition. Polyethylene or polypropylene powders can be used with particle sizes in the range from 0.01 mm to 1 mm, particularly 0.02 mm to 0.3 mm, allowing a good control of the gap between substrates (i.e. the depth of adhesive). Particularly suitable polyethylene powders are commercially available under the trade name Microthene. Polyethylene flock and polyolefin chopped fibre can also be used as fillers. The amount of polyolefin filler may suitably be 0.5% to about 20%, particularly 1.0% to about 10%, by weight of the composition.

Compositions of the present invention may be used as adhesives, sealants, surface coatings, moulding resins and composite matrices, for example with "fleece" or "padding" materials of glass fibre, carbon fibre, metal fibre, polyethylene or polypropylene fibre or foams, or any combination of them, in which bonding to a low surface energy polymer is required.

The compositions may be used in an un-polymerised state, in which case polymerisation occurs in situ, or they may be used in a part-polymerised state, in which case polymerisation is completed in situ.

The components of a two-part composition may suitably be mixed immediately prior to use in a manner known to those skilled in the art.

The compositions of the invention are suited for use with conventional, commercially available dispensing equipment for two-part adhesives, for example a dual syringe applicator and a static mixer nozzle. In general the compositions are suitable for curing at room temperature, i.e. 20-25° C. without added heat or other energy input although heat input may be desirable in some instances, for example to accelerate cure.

The compositions of the present invention may suitably comprise about 0.01% to about 5% by weight of the initiator, about 5% to about 50% by weight of the carrier (if present), about 0.1% to about 20% by weight of the acid (if present), about 5% to about 85% by weight of the polymerisable monomer(s) and about 1% to about 40% by weight of the toughner (if present).

The compositions of the invention may suitably consist essentially of the ingredients defined in the preceding sentence, together with conventional ingredients such as fillers, thickeners or stabilizers, making up the total composition as 100%.

In a two-part composition, the parts may suitably be provided in a weight ratio in the range from 1:10 to 1:1 of initiator Component A to monomer-containing Component B, for example from 1:10 to 1:2, or from 1:10 to 1:4.

EXAMPLES

The following examples will illustrate the invention. In the following examples the sodium tetraethyl borate and the trimethylolpropane tris(3-(2-methylaziridino)propionate used are commercially available from Sigma-Aldrich Ireland Limited of Tallaght, Dublin 24, Ireland. The core-shell tougheners used are commercially available from GE Speciality Chemicals via Blagden Chemical Specialities Limited, London WC1X 8NJ, England under the tradenames Blendex 336 and Blendex 360. The fumed silica used is commercially available under the trade name Aerosil R972 from Degussa via Philips Duphar (Ireland) Limited, Dublin, Ireland.

In the examples the mixed adhesive composition is prepared using a MIXPAC System 50 1:10 volume ratio dual syringe applicator and a 17 stage static mixer nozzle, both commercially available from METIX (UK) Limited of Kettering NN16 8PX, England.

The tests on polypropylene substrates were carried out on filled polypropylene (i.e. polypropylene PP-HWST supplied by Simona U.K. (Limited) of Stafford, England) unless otherwise indicated.

In carrying out the tests, no tendency to catch fire was observed during the handling of the initiator compounds Example 1

Initiator Component (Part A)

Sodium tetraethyl borate (1 g) was mixed with trimethylolpropane tris(3-(2-methylaziridino)propionate thickened with 5% by weight of fumed silica available commercially under the trade name Aerosil R972 from Degussa (25 g) and dissolved by stirring for approximately two hours.

Adhesive Component (Part B)

A slurry comprising a core-shell toughner (100 g), available commercially under the tradename Blendex 360 from GE Speciality Chemicals, tetrahydrofurfuryl methacrylate (249.5 g), 2-ethylhexyl methacrylate (83.2 g), 2-acryloyloxyethyl maleate (67.3 g) and glass spheres available commercially from Aldrich was stirred with a high shear mixer for several hours until a homogeneous dispersion was obtained.

Adhesive

The initiator component A (5 g) and adhesive component B (45 g) were packaged respectively into the two syringes of a MIXPAC System 50 1:10 volume ratio 50 ml dual syringe applicator having a 1:10 volume ratio between the syringes holding the components A and B respectively. The two components were mixed by the simultaneous extrusion through a 17 stage static mixer nozzle. The mixed adhesive composition was tested on a range of substrates as follows:

Samples of the adhesive were spread onto an untreated test-piece (4×1 inches)-101.6×25.4 mm) to form a film of approximately 0.1 mm in depth. Following which a second test-piece was brought against the adhesive to form an overlap adhesive joint with 0.25 inch (6.3 mm) overlap. A clamp was applied to the overlap area and the adhesive joint allowed to cure overnight, approximately 24 hours, at room temperature. The bond strengths for bonds assembled using the above procedure were tested on a Instron tester according to ASTM-D1002 and are presented in the table below.

| Substrates | Shear Strengths MPa |
| --- | --- |
| Polyethylene/Polyethylene | 2.9 |
| Polypropylene/Polypropylene | 3.0 |
| Mild Steel/Polyethylene | 4.6 |
| Mild Steel/Polypropylene | 5.0 |
| Mild Steel/Mild Steel | 13 |

Example 2

Initiator Component (Part A)

Lithium phenyl triethyl borate was prepared [1] by reacting 10 mls triethyl borane (1 Molar in THF) in 30 mls of N-Hexane with 5.6 mls of phenyl lithium (1.8M in cyclohexane/ether) added dropwise over a ten minute period under a nitrogen atmosphere at −85° C. to −90° C. The resulting solution was stirred mechanically for 15 minutes at −85° C. to −90° C. and allowed to return to room temperature and stirred for a further hour. The solvents were removed and trimethylolpropane tris(3-(2-methylaziridino)) propionate thickened with 5% by weight of fumed silica Aerosil R972 manufactured by Degussa (3 g).

1. J. Polymer Science Part A Polym.Chem. 1996,34,13 p.

Adhesive Component (Part B)

The adhesive component was prepared as in Example 1.

Adhesive

A mixed adhesive composition was prepared as in Example 1. The mixed adhesive composition was tested on a range of subtrates as outlined in Example 1. The bond strengths are presented in the table below.

| Substrates | Shear Strengths MPa |
| --- | --- |
| Polyethylene/Polyethylene | 3.6 |
| Polypropylene/Polypropylene | 2.3 |
| Mild Steel/Polyethylene | 3.4 |
| Mild Steel/Polypropylene | 2.8 |
| Mild Steel/Mild Steel | 9.0 |

Example 3 (Comparative)

Initiator Component (Part A)

An organic borate photoinitiator CGI 1584 from Ciba, Basle, Switzerland, (0.2 g) was added to trimethylolpropane tris(3-(2-methylaziridino))propionate (5 g) and stirred until it dissolved.

Adhesive Component (Part B)

A slurry comprising a core-shell toughener (100 g), available commercially under the tradename Blendex 336 from GE Specialty Chemicals, tetrahydrofurfuryl methacrylate (249.5 g), 2-ethylhexyl methacrylate (83.2 g) and 2-acryloyloxyethyl maleate (67.3 g) was stirred with a high shear mixer for several hours until a homogeneous dispersion was obtained.

Adhesive

The mixed adhesive composition was prepared as in Example 1. The mixed adhesive composition was tested on a range of substrates as outlined in Example 1. The bond strengths are presented in the table below.

| Substrates | Shear Strengths MPa |
| --- | --- |
| Polyethylene/Polyethylene | 0 |
| Polypropylene/Polypropylene | 0 |
| Mild Steel/Polyethylene | 0 |
| Mild Steel/Polypropylene | 0 |
| Mild Steel/Mild Steel | 0 |

A similar experiment was carried out with the Ciba Photoinitiator CGI 813, tetra methyl ammonium borate, again giving the same result i.e. no bond strengths on either polyolefins or mild steel.

Example 4

Initiator Component (Part A)

Tetra methyl ammonium phenyl triethyl borate (0.5 g) prepared [1] as outlined in the literature was added to trimethylolpropane tris(3-(2-methylaziridino))propionate thickened with 5% by weight of fumed silica Aerosil R972 manufactured by Degussa (4.5 g).

1. J. Polymer Science Part A Polym. Chem. 1996,34,13 p

Adhesive Component (Part B)

A slurry comprising a core-shell toughener (100 g), available commercially under the tradename Blendex 360 from GE Specialty Chemicals, tetrahydrofurfuryl methacrylate (249.5 g), 2-ethylhexyl methacrylate (83.2 g) and 2-acryloyloxyethyl maleate (67.3 g) was stirred with a high shear mixer for several hours until a homogeneous dispersion was obtained.

Adhesive

The mixed adhesive composition was prepared as in Example 1. The mixed adhesive composition was tested on a range of substrates as outlined in Example 1. The bond strengths are presented in the table below.

| Substrates | Shear Strengths MPa |
| --- | --- |
| Polyethylene/Polyethylene | 2.3 |
| Polypropylene/Polypropylene | 2.6 |
| Mild Steel/Polyethylene | 3.0 |
| Mild Steel/Polypropylene | 3.0 |
| Mild Steel/Mild Steel | 8.0 |

Example 5

Initiator Component (Part A)

The initiator component is prepared as outlined in Example 1.

Adhesive Component (Part B)

A slurry having the ingredients of Adhesive Component B of Example 1 together with a micronised polyethylene powder (50 g) commercially available under the tradename Microthene FN500 distributed by National Chemical Company, Ireland, is stirred with a high shear mixer for several hours until a homogeneous dispersion is obtained.

Adhesive

A mixed adhesive composition is prepared as outlined in Example 1.

The invention claimed is:

1. A polymerisable adhesive composition for bonding a low surface energy substrate to a similar or different substrate, comprising:
    a) at least one free-radically polymerisable monomer component, and
    b) an effective amount or an initiator system for initiating polymerisation of the free-radically polymerisable monomer, wherein said initiator system comprises a compound of the formula I:

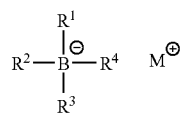

wherein $R^1$ is $C_1$–$C_{10}$ alkyl,
$R^2$, $R^3$ and $R^4$, which may be the same or different, are $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^4$ may optionally be part of a carbocyclic ring, and
$M^+$ is a quaternary ammonium cation.

2. A composition according to claim 1 which is a two-part composition in which the free-radically polymerisable monomer component is provided in one part and the initiator compound of the formula I is provided in the other part.

3. A two-part polymerisable adhesive composition according to claim 1 comprising:
    part A) an effective amount of a polymerisation initiator comprising a compound of the formula I as defined above, and a carrier which is inert to the compound of formula I;
    part B) at least one (meth)acrylate monomer, optionally with a toughener, acidic monomer, filler or thickener.

4. A composition according to claim 1, wherein the initiator compound is of formula I in which each of $R^1$–$R^4$ is a $C_2$–$C_6$ alkyl group.

5. A composition according to claim 1 wherein the initiator compound is of formula I in which M+ is a quaternary ammonium cation of the formula II:

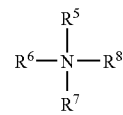

wherein $R^5$–$R^8$ which may be the same or different, are $C_1$–$C_1$ alkyl, $C_{1-C10}$ alkenyl, $C_3$–$C_{10}$ cycloalkyl, aryl, $C_1$–$C_{10}$ alkylaryl, aryl$C_1$–$C_{10}$ alkyl or aryl$C_1$–$C_{10}$ cycloalkyl, provided that any two of $R^5$–$R^8$ may be part of an optionally unsaturated carbocyclic ring.

6. A composition according to claim 1 wherein the initiator compound is of formula I in which three of $R^1$–$R^4$ are the same $C_1$–$C_{10}$ alkyl group and one of $R^1$–$R^4$ is phenyl or phenyl-substituted $C_1$–$C_{10}$ alkyl.

7. A composition according to claim 1, further comprising a polyolefin filler.

8. A composition according to claim 1, wherein the free-radically polymerisable monomer component comprises a (meth)acrylic monomer.

9. A composition according to claim 1, wherein the quantity of the initiator compound of formula I is such as to provide 0.01% to 5% by weight, particularly 0.01% to 2% by weight of boron in the total composition.

10. A composition according to claim 1, further comprising an acidic monomer which is free-radically polymerisable.

11. A method for bonding a low surface energy substrate, such as a polyolefin substrate, to a similar or different substrate, wherein the method comprises applying a composition according to claim 1 to at least one of the substrates, bringing the substrates together with the composition between them and allowing the composition to cure.

12. A method for bonding a low surface energy substrate to a similar or different substrate, wherein the method comprises mixing parts A and B of a two part adhesive composition according to claim 2 immediately prior to use in order to initiate polymerisation, applying the mixed adhesive composition to at least one of the substrates, bringing the substrates together and allowing the composition to cure by completion of the polymerisation initiated on mixing of the two parts A and B.

13. A cured adhesive composition comprising the polymerisation product of a composition according to claim 1.

14. A bonded article comprising two substrates bonded by the polymerisation product of a composition according to claim 1.

15. A bond formed between two substrates by the polymerisation product of a composition according to claim 1.

16. A polymerisable composition, the composition comprising:
    a) at least one free-radically polymerisable monomer component,
    b) an effective amount of an initiator system for initiating polymerisation of the free-radically polymerisable monomer, said initiator system comprising a compound of the formula I as defined in claim 1, and
    c) an effective amount of a compound that is reactive with the compound of the formula I to free an organoborane from the compound of formula I and thus to initiate polymerisation of the at least one free-radically polymerisable monomer.

17. A system capable of initiating the polymerisation of a (meth)acrylic monomer, the system comprising:
   a) a compound of the formula I as defined in claim 1; and
   b) an effective amount of a compound that is reactive with the compound of the formula I to free an organoborane from the compound of the formula I.

18. A polymerisable acrylic composition comprising:
   a) a (meth)acrylate component comprising at least one (meth)acrylic monomer
   b) an effective amount of a compound of the formula I as defined in claim 1; and
   c) an effective amount of a compound that is reactive with the compound of formula I to free an organoborane from the compound of the formula I and thus to initiate polymerisation of the at least one (meth)acrylic monomer.

19. A composite article comprising a first substrate and a second substrate bonded to the first substrate by an acrylic adhesive, wherein the acrylic adhesive comprises the polymerisation product of a polymerisable acrylic composition that comprised:
   a) a (meth)acrylic component comprising at least one (meth)acrylic monomer,
   b) an effective amount of a compound of the formula I as defined in claim 1, and
   c) an effective amount of a compound that is reactive with the compound of the formula I to free an organoborane from the compound of the formula I and thus to initiate polymerisation of the at least one (meth)acrylic monomer.

20. A method of bonding a low surface energy polymer to a substrate, the method comprising the steps of:
   i) providing a low surface energy polymer;
   ii) providing a substrate;
   iii) providing an adhesive composition comprising:
      a) a (meth)acrylic component comprising at least one (meth)acrylic monomer;
      b) an effective amount of a compound of the formula I as defined in claim 1; and
      c) an effective amount of the compound that is reactive with the compound of the formula I to free an organoborane from the compound of the formula I and thus to initiate polymerisation of the at least one (meth) acrylic monomer;
   (iv) applying the adhesive composition to either the low surface energy polymer or the substrate;
   (v) joining the low surface energy polymer and the substrate with the adhesive composition therebetween; and
   (vi) permitting the adhesive composition to cure to adhesively bond the low surface energy polymer and the substrate.

* * * * *